United States Patent
Mandyam et al.

(10) Patent No.: US 6,907,261 B2
(45) Date of Patent: Jun. 14, 2005

(54) APPARATUS, AND ASSOCIATED METHOD, FOR ALLOCATING POWER LEVELS OF BEST-EFFORT COMMUNICATION SIGNALS IN A CDMA COMMUNICATION SYSTEM

(75) Inventors: Giridhar D. Mandyam, Dallas, TX (US); Zhigang Rong, Irving, TX (US); Lin Ma, Irving, TX (US)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 09/966,868

(22) Filed: Sep. 28, 2001

(65) Prior Publication Data

US 2003/0064742 A1 Apr. 3, 2003

(51) Int. Cl.[7] .............. H04B 7/00; H04B 1/00; H04B 17/02; H04Q 7/20
(52) U.S. Cl. .............. 455/522; 455/68; 455/69; 455/135; 455/450; 455/452.2; 455/277.2
(58) Field of Search .............. 455/522, 68, 69, 455/135, 450, 452.2, 277.2, 70, 13.4, 572, 574, 115.3, 115.4, 127.1, 127.2, 127.5

(56) References Cited

U.S. PATENT DOCUMENTS

| | | | |
|---|---|---|---|
| 6,067,458 A | * | 5/2000 | Chen .............. 455/522 |
| 6,330,462 B1 | * | 12/2001 | Chen .............. 455/522 |
| 6,621,804 B1 | * | 9/2003 | Holtzman et al. .......... 370/329 |
| 6,735,449 B2 | * | 5/2004 | Tran .............. 455/522 |
| 6,763,244 B2 | * | 7/2004 | Chen et al. .............. 455/522 |

* cited by examiner

Primary Examiner—Sonny Trinh
(74) Attorney, Agent, or Firm—Federico Fraccaroli

(57) ABSTRACT

Apparatus, and an associated method, for a CDMA communication system. Both closed-loop, power-controlled communication services and best-effort communication services, upon shared channels, are provided in the communication system. A predictor predicts subsequent power level requirements in the system and an allocator allocates power levels at which to communicate best-effort communication signals to effectuate the best-effort communication services.

13 Claims, 3 Drawing Sheets

APPARATUS, AND ASSOCIATED METHOD, FOR ALLOCATING POWER LEVELS OF BEST-EFFORT COMMUNICATION SIGNALS IN A CDMA COMMUNICATION SYSTEM

The present invention relates generally to a manner by which to allocate power levels at which selected signals are sent upon a communication link in a CDMA (code-division, multiple-access) communication system. More particularly, the present invention relates to apparatus, and an associated method, that facilitates selection of power levels at which communication signals are sent to effectuate a best-effort communication service in the CDMA communication system. Selection of the power levels is dependent on the aggregate power levels predicted to be needed to effectuate power-controlled communications services, and the total transmit power level available for all communications upon the communication link.

BACKGROUND OF THE INVENTION

Advancements in communication technologies have permitted the development, implementation, and popular utilization of new types of communication systems. Such advancements are also implemented in existing communication systems to improve operational characteristics thereof. When implemented in communication systems, the advancements in communication technologies generally permit communications to be effectuated at increased rates of data transmission and otherwise provide for improved qualities and quantities of communication data transfer between sending and receiving stations operable in such communication systems.

New types of radio communication systems are exemplary of communication systems that have been made possible as a result of advancements in communication technologies. In a radio communication system, a radio link interconnects a sending station and a receiving station. Communication channels upon which data is communicated between the sending and receiving stations are defined upon the radio link. Because the radio link is utilized to define the communication channels, wire line connections, conventionally required to interconnect the sending and receiving stations is obviated. Increased communication mobility, relative to a conventional wire line system, is thereby provided in a radio communication system.

A cellular communication system is an exemplary type of radio communication system. A cellular communication system is a multi-user communication system permitting communications to be effectuated concurrently pursuant to a plurality of communication sessions with a plurality of mobile stations operable in the communication system.

Various standards have been promulgated relating to various types of cellular communication systems. And, various types of cellular communication systems have been constructed corresponding to such standards. The IS-95/IS-2000 interim standards promulgated by the EIA/TIA, e.g., are exemplary of standards that pertain to cellular communication systems and which utilize CDMA (code-division, multiple-access) communication techniques. In a CDMA communication system, a plurality of concurrently-generated communication signals are generated concurrently upon a common frequency range. Because of the concurrent use of the common frequency range, the power levels, at which each of the signals are generated upon the common frequency range, must be regulated. If a communication signal is sent upon the communication link at too-high of a power level, the communication signal might interfere with other concurrently-transmitted communication signals upon the communication link.

Closed loop power control schemes are incorporated into the IS-95/IS-2000 family of standards. For instance, to effectuate forward-link power control, a fast power control scheme is used. The forward link refers to the portion of the communication link upon which communication signals, originated at network infrastructure of the CDMA system, are communicated to a mobile station. Forward-link channels are defined upon the forward link. In the fast power control scheme, power control bits are generated and transmitted by the network infrastructure upon a forward link channel to a mobile station. The power control bits are used, once received at the mobile station, to control the power levels at which reverse link communication signals are generated by the mobile station. Two-way power control is effectuated in which power control bits are generated at the mobile stations, transmitted to the base station, and used to control the power levels of signals generated on the forward link.

The existing fast power control scheme is effective in its operation to power-control communication signals, such as those conventionally generated pursuant to a circuit-switched communication session. Circuit-switched communications are advantageously used to effectuate real-time communication services. Use of circuit-switched connections, however, are fairly bandwidth-consumptive. Circuit-switched communications are amenable to power-control pursuant to such a power control scheme. Guarantees of QoS (Quality of Service) levels are better assured when the signals are communicated in manners in which their power levels can be controlled.

As, increasingly, non-real-time communication services are being provided in a radio context, shared channels are able to be utilized to communicate communication signals used to implement the non-real-time communication services. Because a shared channel is potentially utilized to effectuate more than one communication session, the bandwidth available upon a communication link is more efficiently utilized.

Conventional fast power control schemes utilized to effectuate power control in an IS-95/IS-2000 communication system are not readily adaptable to effectuate power control upon shared channels. The non-adaptability of the existing fast power control scheme to shared-channel communications is due to the potentially brief duration of transmission of communication signals pursuant to a particular communication session. The amount of time required for settling of the power control loop formed in the existing, fast power control scheme is potentially greater than the duration of transmission of the communication signal.

A better manner of controlling power levels of communication signals sent upon a shared channel defined upon a communication link in a CDMA communication system is, therefore, required.

It is in light of this background information related to power control schemes in a CDMA communication system that the significant improvements of the present invention have evolved.

SUMMARY OF THE INVENTION

The present invention, accordingly, advantageously provides apparatus, and an associated method, by which to allocate power levels at which selected signals are sent upon a communication link in a CDMA (code-division, multiple-access) communication system.

Through operation of an embodiment of the present invention, a manner is provided by which to facilitate selection of power levels at which communication signals are sent to effectuate a best-effort communication service that utilizes a shared channel upon the communication link.

Selection of the power levels at which the communication signals are sent upon the shared channel of the communication link better ensures that the power levels at which the communication signals transmitted upon the shared communication channel defined upon the communication link are not of too-high power levels to interfere with other communications being effectuated upon the communication link. Thereby, through use of an embodiment of the present invention, improved communications are provided in a CDMA communication system that provides for communication services effectuated upon a shared communication channel.

In one aspect of the present invention, the aggregate power levels of all communication signals communicated upon a communication link extending between the network infrastructure and mobile stations of the CDMA communication system is a set value. A set value is, for instance, a system-defined maximum power level, or an operational parameter selectable during operation of the communication system. Communication channels defined upon the communication link include channels utilized for overhead, i.e., non-traffic, communications between the network infrastructure and the mobile stations. The communication link is further utilized to effectuate communication services which are implemented by circuit-switched connections, or communication services in which quality of service (QoS) levels are guaranteed. And, the communication link is further utilized to effectuate best-effort communication services. Best-effort communication services are effectuated, here, on shared channels. Best-effort communication services generally include communication services which do not require a circuit-switched connection or which does not guarantee a selected quality of service level.

In another aspect of the present invention, predictions are made of anticipated power levels that shall be required to be allocated to communication signals transmitted to effectuate guaranteed QoS-level communication services during a subsequent time period. The subsequent time period defines an allocation interval The predictions are based upon prior power levels at which such communication signals have been transmitted. The predictions are made responsive to prior power control commands communicated pursuant to a conventional fast power control scheme.

In another aspect of the present invention, once predictions are made of the power allocations that shall subsequently need to be made to effectuate guaranteed QoS communication services or other power-controlled communication services, part of the remaining portion of the available power is made available for best-effort communication signals used to effectuate best-effort communication services. The power level allocations are made to be effective for an allocation interval.

In another aspect of the present invention, dynamic reallocation of the power levels is made, as necessary, when actual aggregate power levels exceed the predicted power levels. Power backoff is performed to reduce the power levels allocated to the shared channel. Thereby, the communication quality levels of communication signals generated to effectuate guaranteed quality communication services are more likely to be maintained. The power backoff on the shared channel, however, potentially degrades the performance of communications effectuated upon the shared channel.

In one implementation, a power-backoff approach is used to ensure that the quality levels of power-controlled communication services, such as guaranteed QoS communication services, are not caused to be unmet as a result of over-allocation of power levels to effectuate best-effort communication services. Power allocations made for best-effort communication signals are based upon allocation to power-controlled communication services assuming a worst-case scenario, with respect to the best-effort communications. That is, power allocations to the best-effort communication signals are based upon a scenario in which all power-controlled communication signals are to have an increase in power levels during a link allocation interval. Thereby, over allocation of power to the shared-channel communication signals does not occur.

In a predictive power allocation approach, the power allocated to the shared-channel communication signals is dependent upon a model of expected power requirements of the power-controlled communication signals. The model utilizes an auto-regressive process in which the power control commands previously generated to effectuate fast closed loop power control are used to predict subsequent power requirements.

In these and other aspects, therefore, apparatus, and an associated method, is provided for a multi-user communication system in which a radio link is defined and upon which both power-controlled communication services and best-effort communication services are effectuable. The radio link extends between a sending station and at least a first receiving station. Power level allocation of at least a first best-effort communication signal communicated upon the radio link pursuant to effectuation of at least a first best-effort communication service is facilitated. A predictor is coupled to receive indicia associated with transmit power levels at which power-controlled communication signals sent upon the radio link to effectuate the power-controlled communication services are transmitted. The predictor predicts subsequent power levels at which the power-controlled communication signals shall subsequently be transmitted. An allocator is coupled to the predictor to receive indications of predictions made thereat. The allocator allocates the power levels at which subsequently to transmit the at least the first best-effort communication signal.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
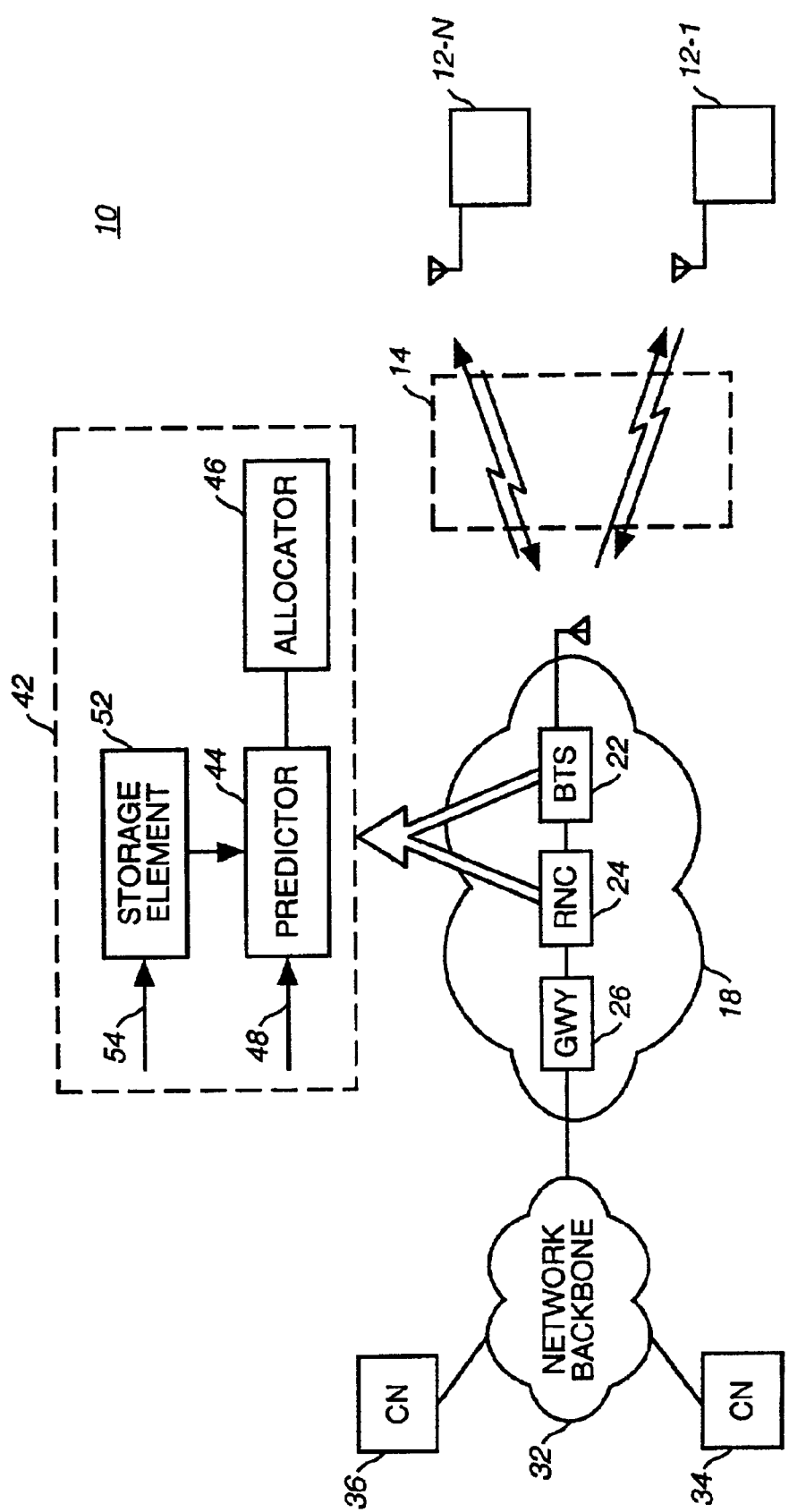
FIG. 1 illustrates a functional block diagram of a radio communication system in which an embodiment of the present invention is operable.

Referring first to FIG. 1, a radio communication system, shown generally at 10, provides for radio communications between mobile stations 12 and a network part of the communication system. In the exemplary implementation, the communication system is operable generally pursuant to the IS-95/IS-2000 family of standards adapted to provide for 1XTREME (1X third-generation radio with enhanced modulation and encoding) data services. While the following description shall describe operation of the communication system, and operation of an embodiment of the present invention therein, with respect to an IS-95/IS-2000 system in which 1XTREME is deployed, the teachings of the present invention can analogously be implemented in other communication systems.

The communication system 10 is a multi-user communication system that permits communication services to be effectuated concurrently with a plurality of mobile stations. Separate communication services are effectuable with separate mobile stations and, also, multicast communications are effectuable with a common group of the mobile stations. Here, two mobile stations, mobile stations 12-1 and 12-n, are shown in the figure.

A communication link 14, here a radio link, interconnects the mobile station 12 with the network part of the communication system. Channels are defined upon the communication link, and channel differentiation is provided by WALSH coding of communication signals prior to their communication upon the communication link. Code-division, multiple-access is thereby provided. The power levels at which communication signals are communicated upon the communication link must be great enough to permit detection of the communication signal at an intended receiving station. But, the power levels of the communication signals must not be so great as to "crowd-out" other concurrently-communicated signals. If the power level of a communication signal is too high, the communication signal interferes with communication of other concurrently-communicated communication signals. The power levels at which the communication signals are communicated upon the communication link must, therefore, be carefully selected, or otherwise regulated.

The network part of the communication system includes a radio access network (RAN) 18. Here, the radio access network is shown to include a base transceiver station (BTS) 22, a radio network controller (RNC) 24, and a gateway (GWY) 26.

The base transceiver station operates to transceiver communication signals upon the communication link 14 with the mobile stations 12. The radio network controller is coupled to the base transceiver station and is operable to control various operations of the radio access network, including operations of the base transceiver station. And, the gateway connects the radio access network with a network backbone 32. The network backbone is here representative of a packet data network, such as the Internet, and a public-switched, telephonic network.

Correspondent nodes (CNs) 34 and 36 are coupled to the network backbone. The correspondent node 34 is here representative of a correspondent entity that communicates with a mobile station, such as the mobile station 12-1, pursuant to a best-effort communication service during a communication session. And, the correspondent node 36 is here representative of a correspondent entity that communicates with a mobile station, such as the mobile station 12-n, pursuant to a guaranteed QoS communication service, or other power-controlled service, during a communication session. The term "guaranteed QoS communication service" here refers to any service in which closed-loop power-control, such as fast power control, is used.

Both power-controlled communication signals and best-effort communication signals are, therefore, communicated upon the communication link. Additionally, control, and other overhead, information, here referred to as an overhead communication signal, is also communicated upon the communication link. The power levels at which any of the communication signals are communicated upon the communication link must not be of too-high power levels to interfere with other concurrently-communicated signals. And, the aggregate power levels of all of the communication signals cannot exceed a total power level. The power levels at which the overhead communication signals are communicated are of prescribed levels, and the power levels of the power-controlled communication signals are regulated pursuant to a closed-loop power control scheme. The power control scheme regulates the power levels at which the power-controlled communication signals are communicated in a manner such that the guaranteed quality levels are achieved. Therefore, of the total, aggregate power level available at the communication link, the amount of power available for the effectuation of best-effort communication services is the aggregate, total power less the power required to communicate the overhead communication signals, and, less the power levels allocated for communication of the power-controlled communication signals.

As noted previously, best-effort communication signals are communicated upon a shared channel. And, such signals might well be of durations less than the time period required of existing fast power control loops to settle. Use of a closed-loop, fast power control scheme to regulate the power levels at which the best-effort communication signals are communicated, therefore, would not ensure that the appropriate level of power regulation would be achieved.

The communication system 10 includes apparatus 42 of an embodiment of the present invention. The apparatus 42 facilitates selection of power levels at which best-effort communication signals are communicated upon the communication link. In the exemplary implementation, the apparatus is positioned at the radio access network 18, located, for instance, at the radio network controller or the base transceiver station, or distributed therebetween. The apparatus is formed of elements which are functionally represented in the figure. Such elements are implemented in any desired manner, such as by algorithms executable at a processing device.

The apparatus 42 here includes a predictor 44. The predictor is operable to predict the power requirements of the power-controlled communication signals during a subsequent allocation interval.

The apparatus further includes an allocator 46 coupled to the predictor. The allocator is operable to select power levels at which best-effort communication signals shall be communicated during the allocation intervals. As a plurality of different best-effort communication signals pursuant to a plurality of best-effort communication sessions are capable of communication upon the shared channel, the allocator allocates power levels to such plurality, if necessary. And, responsive to the power level selections made by the allocator, power is allocated to the individual best-effort communication signals for communication upon the communication link during the subsequent allocation interval.

The predictor is coupled to receive indications of power control bits generated by individual ones of the mobile stations 12 pursuant to a fast, closed-loop power control scheme generated during a communication session in which power-controlled communication signals are generated. The arrow 48 extending to the predictor is representative of the application of the power control bits to the predictor. The indications of the power control bits are also provided to a storage element 52. The storage element 52 also forms a portion of the apparatus of the exemplary implementation. The storage element 52 stores values of the power control bits generated during effectuation of the fast power control of the power-controlled communication sessions. Application to the storage element of such values is indicated by the arrow 54. The storage element is coupled to the predictor so that the values stored at the storage element are accessible by the predictor. In one implementation, the values stored at the storage element form historical values used by the predictor to make predictions of subsequent power needs of the power-controlled communication sessions.

Generally, therefore, the apparatus 42 updates, and maintains, a predictor that can track the anticipated power control commands from each power-controlled user pursuant to a power-controlled communication session based on previous commands received by the fast power control loop of such communication session. During an allocation interval, a fraction of the power allocated to the shared channel is allocated by an allocation procedure. Thereafter, during the allocation interval, reallocation of the allocated power is permitted. If power control commands are received pursuant to the fast power control loop that are contrary to the predictions that have been made for the allocation intervals that necessitate a reallocation of the power levels at which the best-effort communication signals are communicated upon the communication link is made. Thereby, the guaranteed quality levels of power-controlled communication services are maintained, albeit at the cost of a potential degradation of the quality levels of the best-effort communication services.

In one implementation, power selections are made in manners that ensure the power requirements of the power-controlled communication signals are met during the allocation interval. To obtain this assurance, power allocations to the best-effort communication signals are based upon a worst-case scenario in which all of the power-controlled communication signals are to have their respective power levels increased during the allocation interval, e.g., to maintain a desired QoS level. That is, the worst-case scenario occurs when the fast power control bits returned to the radio access network by individual ones of the mobile stations indicate that the power levels of subsequent communication signals generated pursuant to effectuation of the power-controlled communication services are to be increased.

The maximum allocation at a given power control group for a shared channel is determined as follows:

$$P_{sh}(n) = P - \sum_{k=1}^{K} \left( v_k(n) 10^{\Delta \frac{T}{L}/10} \right), n = 0, \frac{T}{L}, \frac{2T}{L}, \frac{3T}{L}, \dots$$

wherein:

K is the number of power-controlled communication sessions ongoing during an allocation interval;

P is the aggregate transmit power available for all traffic channels upon the communication link;

T is the allocation interval;

L is a power control command interval;

B is the power step size (dB scale), assuming a one-bit quantization for power control commands; and $v_{k(n)}$ is the present power allocation for a single power-controlled communication signal in which k is the user index and n is the power control group index.

Analysis of the equation indicates that as the ratio of T/L increases, the allocation to the shared channel becomes lower. Operation of the apparatus 42 pursuant to this equation is a power-back-off implementation of the apparatus.

Alternately, in another implementation, subsequent power control commands are predicted responsive to previous power control commands. Based upon the predictions of the subsequent power control commands, predictions are made of the power requirements of the power-controlled communication signals during a subsequent allocation interval. Modeling is performed utilizing an auto-regressive process. As the communication link can be modeled by an auto-regressive process, the power control command sent in response to channel indications of the communication link can also be modeled using the auto-regressive process.

Predictions of the subsequent power control commands received by a specific mobile station, mobile station k, operable pursuant to a power-controlled communication session, are made as a function of previous power control commands sent by that user as follows:

$$\hat{P}_c^k(n) = \sum_{i=1}^{M} d_i P_c^k(n-i)$$

in which coefficients $d_i$ are estimated and refined based upon prior power control commands that have previously been received. And, M is a model order index that is determinable experimentally.

As a result, the power allocated to the shared channel is made based upon predictions formed responsive to calculations of the anticipated power control commands anticipated to be generated by the power control loops of each power-controlled communication session. The allocation of the shared channel power is made as follows:

$$P_{sh}(n) = P - \sum_{k=1}^{K} \left( v_k(n) 10^{\sum_{i=\frac{T}{L}-1}^{T/L-1} \hat{P}_c(n+1)/10} \right), n = 0, \frac{T}{L}, \frac{2T}{L}, \frac{3T}{L}, \dots$$

If T/L is greater than 1, then the predicted power control commands may also be based partially upon previous, predicted power control commands. In other words, $$\hat{P}_c^k(n+l) = \sum_{i=l+1}^{M} d_i P_c^k(n+l-i) + \sum_{i=1}^{l} d_i \hat{P}_c^k(n+l-i), l = 1, 2, \dots$$

In an alternative approach, a lowered likelihood of reducing the power allocation to the shared channel within a single allocation interval would be to predict the maximum power levels from each individual, power-controlled communication session, and to use such values to allocate power to the shared channel. The maximum predicted power allocation for an individual, power-controlled communication session is determined as follows:

$$\hat{v}_k^{max}(n) = \max_{r=0 \dots \frac{T}{L}-1} \left\{ v_k(n) 10^{\sum_{i=0}^{r} \hat{P}_c(n+r)/10} \right\}$$

As a result, the power allocation becomes:

$$P_{sh}(n) = P - \sum_{k=1}^{K} \hat{v}_k^{\max}(n), \, n = 0, \frac{T}{L}, \frac{2T}{L}, \frac{3T}{L}, \ldots$$

Figure 2:
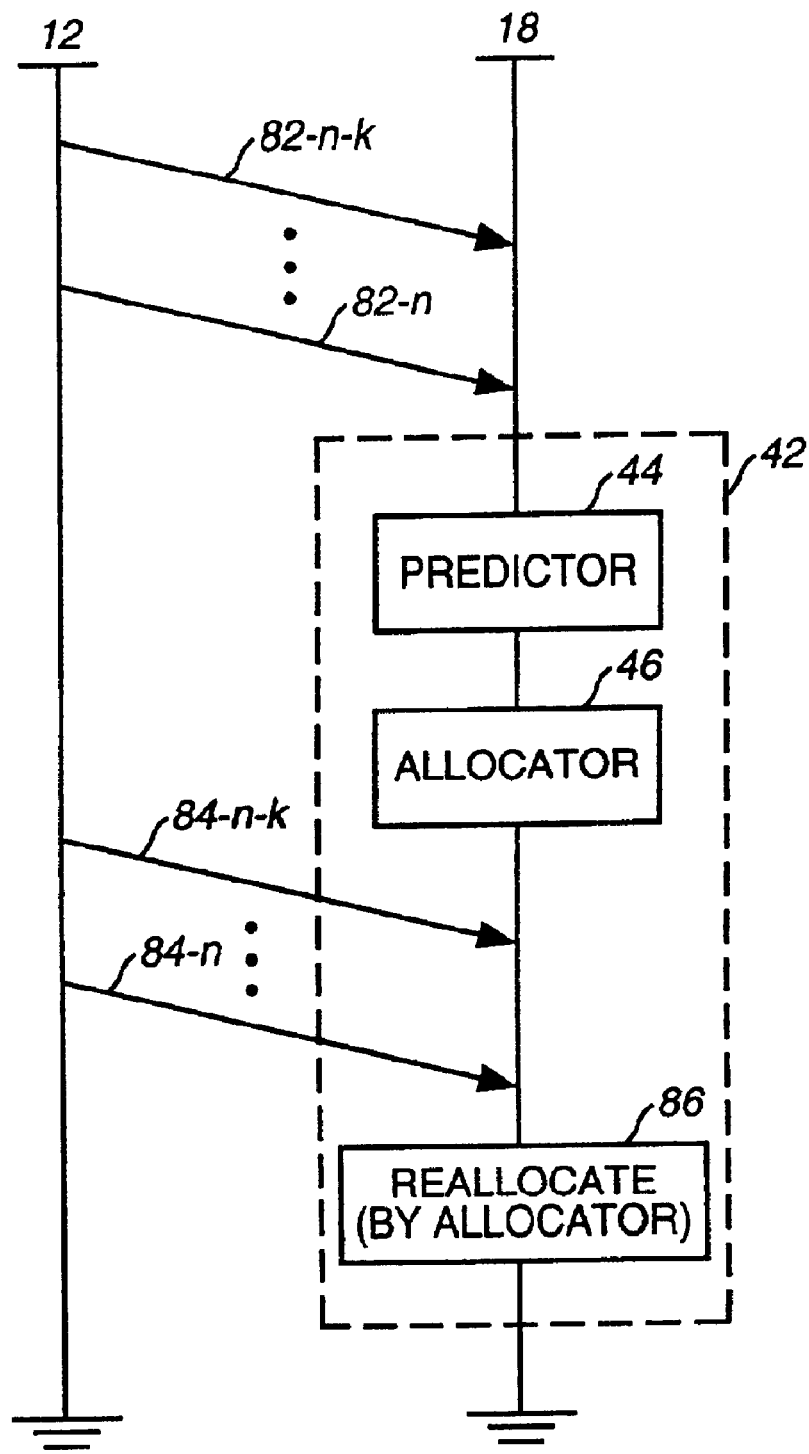
FIG. 2 illustrates a message sequence diagram that illustrates signaling generated during operation of an embodiment of the present invention in the communication system shown in FIG. 1.

FIG. 2 illustrates a message sequence diagram, shown generally at 78, showing signaling generated during operation of the communication system 10. Here, segments 82-n-k through 82-n are representative of communication of power control commands to the radio access network by the mobile stations 12-n-k through 12-n that are operable pursuant to power-controlled communication sessions. The power control commands are detected at the radio access network and provided to the apparatus 42 thereof.

Indications of the power control commands are provided to the predictor 44, and predictions of power-level requirements of power-controlled communication signals to be generated during a subsequent allocation interval are generated. Indications of the predictions are provided to the allocator 46. Selections are made by the allocator of power levels at which best-effort communication signals to be generated upon a shared channel are to be allocated during the subsequent allocation interval.

During the subsequent allocation interval, additional power control commands, indicated by the segments 84-n-k through 84-n are provided to the radio network controller. The additional power control commands are monitored and utilized, if appropriate, to reallocate, indicated by the block 86, the power levels allocated to the best-effort communication sessions.

Figure 3:
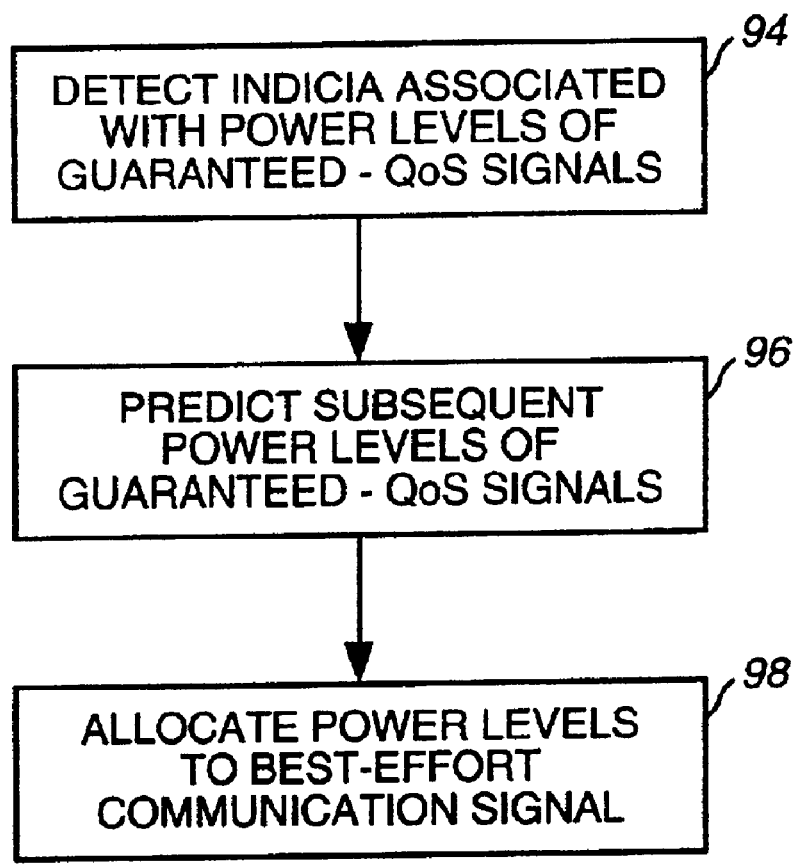
FIG. 3 illustrates a method flow diagram listing the method of operation of the method of an embodiment of the present invention.

FIG. 3 illustrates a method, shown generally at 92, of an embodiment of the present invention by which to facilitate allocation of power levels of at least a first best-effort communication signal upon a radio link in a multi-user communication system. The first best-effort communication signal is communicated pursuant to effectuation of at least a first best-effort communication service between a sending station and at least a first receiving station.

First, and as indicated by the block 94, indicia associated with transmit power levels at which power-controlled communication signals sent upon the radio link to effectuate guaranteed-QoS, or other power-controlled,communication services is detected. Then, and as indicated by the block 96, subsequent power levels at which the power-controlled communication signals shall subsequently be transmitted is predicted. And, as indicated by the block 98, the power levels at which subsequently to transmit the at least the first best-effort communication signal are allocated.

Thereby, a manner is provided by which to facilitate allocation of power selection of power levels at which communication signals are sent to effectuate a best-effort communication service in a CDMA system.

The preferred descriptions are of preferred examples for implementing the invention, and the scope of the invention should not necessarily be limited by this description. The scope of the present invention is defined by the following claims.

What is claimed is:

1. Apparatus for a multi-user communication system defining a radio link upon which both closed-loop, power-controlled communication services and best-effort communication services are effectuable thereon between a sending station and at least a first receiving station, said apparatus for facilitating allocation of power levels of at least a first best-effort communication signal communicated upon the radio link pursuant to effectuation of at least a first best-effort communication service between the sending station and the at least the first receiving station, said apparatus comprising:

a storage element for storing indicia associated with prior transmit power levels at which closed-loop, power-controlled communication signals have previously been sent upon the radio link;

a predictor coupled to said storage element for accessing the indicia associated with prior transmit power levels at which the closed-loop, power-controlled communication signals sent upon the radio link to effectuate the guaranteed QoS communication services are transmitted, said predictor for predicting subsequent power levels at which the closed-loop, power-controlled communication signals shall subsequently be transmitted;

an allocator coupled to said predictor to receive indications of predictions made thereat and coupled to receive indicia associated with present power levels at which the closed-loop, power-controlled signals are sent, said allocator for allocating the power levels at which subsequently to transmit the at least the first best-effort communication signal, the power levels allocated being related to a ratio of a link allocation interval to a power control command interval, and said allocator further for selectably reallocating the power levels at which subsequently to transmit the at least the first best-effort communication signal, reallocation made in manners to reduce the power levels at which subsequently to transmit the at least the first best-effort communication signal.

2. The apparatus of claim 1 wherein the power levels are allocated by said allocator are at least step-wise proportional to the ratio of the link allocation interval to the power command control interval.

3. The apparatus of claim 1 wherein predictions of the subsequent power levels at which the closed-loop, power-controlled communication signals shall subsequently be transmitted are made pursuant to an autoregressive process.

4. The apparatus of claim 3 wherein the predictions are successively altered responsive to successive indicia associated with the prior power levels measured at successive intervals.

5. The apparatus of claim 4 wherein a plurality of closed-loop, power-controlled communication signals are concurrently sent upon the radio link to effectuate a plurality of closed-loop, power-controlled communication services, and wherein predictions made by said predictor are made responsive to indicia associated with the transmit power levels of each of the plurality of guaranteed QoS communication signals.

6. The apparatus of claim 5 wherein predictions made by said predictor of the subsequent power levels at which the closed-loop, power-controlled communication signals shall subsequently be transmitted comprise predictions of maximum power levels at which each of the closed-loop, power-controlled communication signals shall subsequently be transmitted.

7. The apparatus of claim 1 wherein the at least the first best-effort communication signal comprises a plurality of best-effort communication signals and wherein said allocator allocates the power levels at which subsequently to transmit each of the plurality of the best-effort communication signals.

8. The apparatus of claim 1 wherein the multi-user communication system comprises a CDMA (code-division, multiple-access) cellular communication system, wherein the radio link comprises a downlink, the sending station comprising a base transceiver station forming part of a system network, and the at least the first receiving station comprising a first mobile station and at least a second mobile station, and wherein said predictor and said allocator is positioned at the system network of the CDMA cellular communication system.

9. The apparatus of claim 8 wherein the closed-loop, power-controlled communication signals sent upon the down link to effectuate the closed-loop, power-controlled services are power-controlled pursuant to a closed-loop power control scheme, wherein the at least the first best-effort communication signal comprises at least a first time-multiplexed signal sent on a shared channel defined upon the forward link and wherein said allocator allocates the power levels at which subsequently to transmit the at least the first time-multiplexed signal.

10. A method for communicating in a multi-user communication system defining a radio link upon which both closed-loop, power-controlled communication services and best-effort communication services are effectuable thereon between a sending station and at least a first receiving station, said method for facilitating allocation of power levels of at least a first best-effort communication signal communicated upon the radio link pursuant to effectuation of at least a first best-effort communication service between the sending station and the at least the first receiving station, said method comprising:

detecting indicia associated with prior transmit power levels at which closed-loop, power-controlled communication signals have previously been sent upon the radio link to effectuate the closed-loop, power-controlled communication services are transmitted;

predicting subsequent power levels at which the closed-loop, power-controlled communication signals shall subsequently be transmitted responsive to detections made during said operation of detecting and allocating the power levels at which subsequently to transmit the at least the first best-effort communication signal responsive to predictions made during said operation of predicting, the power levels allocated being related to a ratio of a link allocation interval to a power control interval.

11. The method of claim 10 wherein predictions made during said operation of predicting are responsive, at least in part, to values of the indicia associated with the prior power levels.

12. The method of claim 11 wherein said operation of predicting comprises performing an auto-regression procedure upon indicia of successive prior power levels.

13. The method of claim 10 further comprising the operation of selectably reallocating the power levels allocated during said operation of allocating, thereby to reduce selectably the power levels.

* * * * *